United States Patent Office 2,792,074
Patented May 14, 1957

2,792,074

BAG-FILTER DUST COLLECTOR FOR HOT GASES

Theodore W. Schilb, Jeffersonville, Ind., and Burton B. Crocker, Creve Coeur, Mo., assignors to Monsanto Chemical Company, St. Louis, Mo., a corporation of Delaware Application September 30, 1954, Serial No. 459,478

2 Claims. (Cl. 183—32)

This invention relates to a novel bag-filter dust collector which can be used for separating hot solids from a hot gas without damage to the filter fabric.

Various bag-filter dust collectors are well known in the prior art. However, the conventional dust collectors have been limited to the removal of solids from gases where the temperature thereof is substantially below the scorch temperature of the bag fabric. When it has been necessary to effect the separation of solids from gases in a system requiring elevated temperatures, it has been necessary to cool the hot gas by bleeding in cool air or gas in a mixing chamber prior to passing the dust-laden gas through the filter. This practice requires that the surface area of the filter bags be materially increased and/or the gas must be introduced at far higher pressures to handle the increased volume of gas. Often the solid being recovered from the hot gas stream is sensitive to moisture or may be easily oxidized. The prior art system then demands that the air be dried prior to bleeding into the gas stream in the former case and that an inert cooling gas be employed in the latter case. It is readily apparent that all of the foregoing practices are unsatisfactory as they require needless expense in (1) shortened life of the filter bag, (2) larger filter bag area and housing, (3) extra equipment to dry the air, (4) the use of inert gases, etc.

It is an object of the instant invention to provide a bag-filter dust collector for hot gases wherein the bag fabric is not scorched after long use, notwithstanding the fact that the temperature of the hot gases are up to about 200° F. or higher above the prior art safe upper limit of the fabric. It is another object to provide a bag-filter dust collector for hot gases wherein the volume of gas filtered for any given system is materially reduced by the elimination of cool air bleed-in thereby effecting substantial savings in the number of bag filters necessary for a given system. Still another object is to provide a bag-filter dust collector for hot gases wherein it is not necessary to treat the large volume of cooling gas or employ expensive inert gases for special systems. Other objects will be apparent to those skilled in the art in view of the following disclosure.

It has now been found that all of the prior art problems can be solved by passing the hot, solid-laden gas directly into the filter bags and introducing the cooling air around the outside of the filter bags. The cooling air carries the heat away from the outside of the filter bag such that the filter bags can be operated at far higher temperatures that prior to this invention without scorching. The volume of cooling gas can be readily controlled by circulating any desired amount of cooling gas through the system without affecting the area of the filter bags. The volume of cooling air is controlled by varying the air pressure in the cooling-gas-inlet chamber when the cooling-gas-outlet openings are fixed. This practice is adequate for most requirements when the apparatus is employed for systems having similar temperature ranges and air flows. However, care must be exercised in the design of the apparatus to avoid the necessity of employing a relatively high pressure to provide a sufficient volume of cooling air to pass through the cooling-gas outlets surrounding the base of the filter bags, since if the air pressure is too high in relation to the plate openings, there may be a tendency to create zones of local overheating of the bag at its base due to air streaming. Where necessary this difficulty can be readily corrected by providing a means of varying the cooling-gas-outlet openings by the use of damper plates. The damper plates can be set individually, linked together in a bank, or controlled by a single lever actuated manually or by a motor through suitable limit switches to automatically maintain the desired temperature range in the filter-bag housing.

The conventional filter fabrics are cotton, wool, nylon, Orlon, and other suitable synthetic fabrics. The generally recommended maximum operating temperatures for cotton is about 190° F., for wool about 235° F., and for Orlon about 300° F. However, it is necessary to stay well below these limits for good filter-bag life. Special glass fabrics and asbestos fabrics have been employed in high temperature operations, but the results have not been very satisfactory because of excessive bag failure at relatively high replacement cost.

With the improved practice of this invention, filter bags have been run for weeks at temperatures far in excess of the above recommended upper limits without any evidence of scorching.

The filter bags are provided with a means to free the impinged solids from the interior bag surface, e. g., vibrating, shaking, flexing, moving air ring, etc. and drop said solids down into the collection hopper in a manner known to those skilled in the art. The release of impinged solids can be effected continuously or intermittently or the collector can be sectioned into two or more independent compartments, each having the complete elements of the novel collector described herein, such that each compartment can be manually or automatically shut down and the impinged solids released while the remaining compartments continue to filter the hot dust-laden gas.

The hopper is provided by any suitable dump valve, as for example, a rotary air lock barrel valve, a screw conveyor valve, slide valve, etc. The hopper may be designed to effect a partial separation of the hot gas and solids by baffle plates, providing a tangential gas inlet in the upper portion of an inverted cone shaped hopper, and other means to cause the larger-sized, heavier particles to be dropped from the hot gas stream.

The aforesaid features relating to the solid release mechanism and the hopper section are conventional practice and do not form a part of this invention. Representative filter-bag, dust-collecting apparatus is shown, e. g., in U. S. Patent Nos. 2,014,298, 2,137,254, 2,143,664, and 2,667,233.

The present invention is exemplified in the accompanying illustrative drawings wherein.

Figure 1:
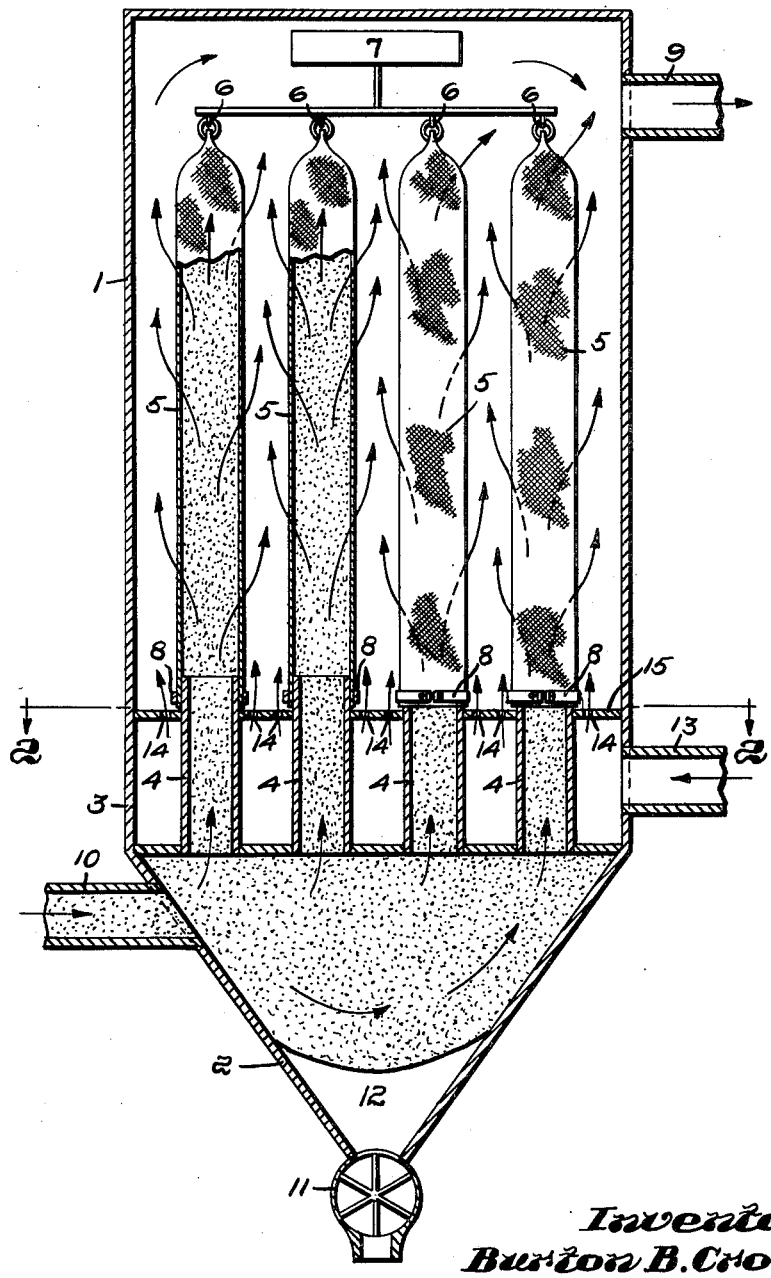
Fig. 1 is a vertical, cross-sectional view through one form of bag-filter dust collector constructed in accordance with the present invention.

Referring to Fig. 1, the bag-filter dust-collector apparatus is mounted on any suitable supporting frame and basically consists of a three-sectioned chamber, the component parts of which are the enclosed-filter chamber 1, the solids-collection chamber 2, and the cooling-gas-inlet chamber 3.

The chamber 1 is provided with a plurality of hot, solid-laden gas inlets 4 which are passageways directly connected to the chamber 2. Each of the inlets 4 are provided with a flexible, elongated, tubular bag filter 5 of suitable fabric arranged in a substantially vertical position within the chamber 1. The bag filters 5 are closed at their upper ends and supported by a suspension means 6, which is linked to a shaking means 7 thereby vibrating, shaking and flexing the filters 5 when actuated, causing the impinged solids to be loosened and drop into the chamber 2 hopper through the inlet passageway 4. The shaking means 7 can be located outside the chamber 1 when the temperature of the exit gas is higher than recommended for the operation of electric motors. The bag filters 5 are open at their lower ends and removably affixed to the hot-gas-inlet passageways 4 through a collar means 8 to provide a substantially gas-tight seal. The chamber 1 is also provided with an outlet 9 to exhaust the cooled, filtered gas.

The solids-collection chamber 2 is provided with hot solid-laden gas inlet 10 and a solids-discharge valve 11 at the bottom of said chamber 2. Preferably the choice of discharge valve 11 should be such as to provide removal of the collected solids 12 without effecting any substantial gas pressure reduction in the system.

The cooling-gas-inlet chamber 3 is interposed between the filter chamber 1 and solids collection chamber 2 and effects a partial cooling of the hot gas by heat exchange through the inlet passageway 4 walls. The preliminary cooling, just prior to passing the hot, solid-laden gas into the bag filters, can be increased by affixing radial fins to the exterior of the passageway walls. This chamber 3 is provided with a gas inlet 13 and a plurality of gas outlets 14 which form cooling-gas-inlets in filter chamber 1. These openings 14 in the plate 15 separating chambers 1 and 3 are uniformly located circumferentially around the outside of the hot-gas-inlet passageways 4 with the filter bags 5 affixed thereto and are closely spaced to the base of the filter bags such that the cooling gas issuing therefrom will bathe the exterior of the filter bags in a stream of cooling gas, thereby removing heat from the filter bag surface to prevent scorching of the bag fabric. It will be readily apparent that the volume of cooling gas can be varied as desired to maintain any suitable temperature of the gases in chamber 1 without altering the filter area of the bag filters, altering the rate of hot gas flow through the filter, or requiring any special handling or treatment of the cooling gas as removing water, oxygen, etc. or providing an expensive inert gas.

Figure 2:
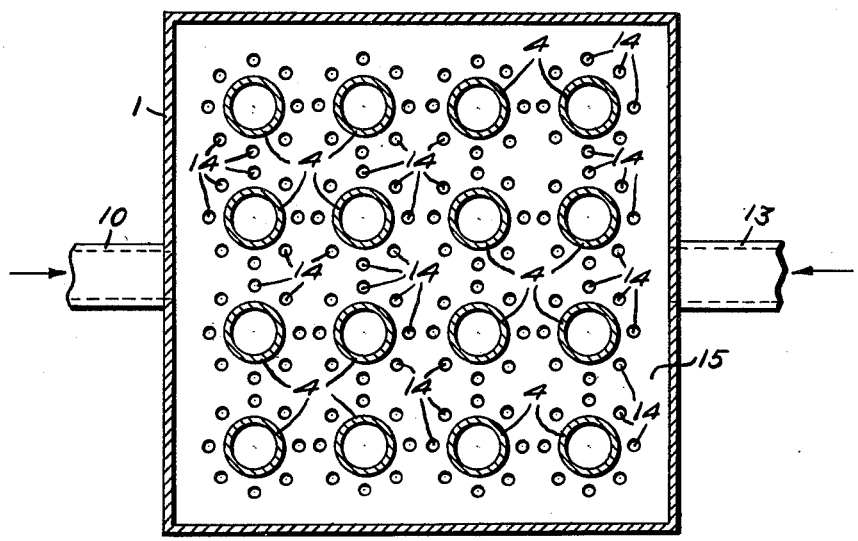
Fig. 2 is a partial cross-sectional view taken along the section line 2—2 of Fig. 1.

Fig. 2 more clearly shows the plurality of cooling-gas inlets 14, through the plate 15 separating chambers 1 and 3, uniformly spaced circumferentially around the hot-gas inlet 4.

Figure 3:
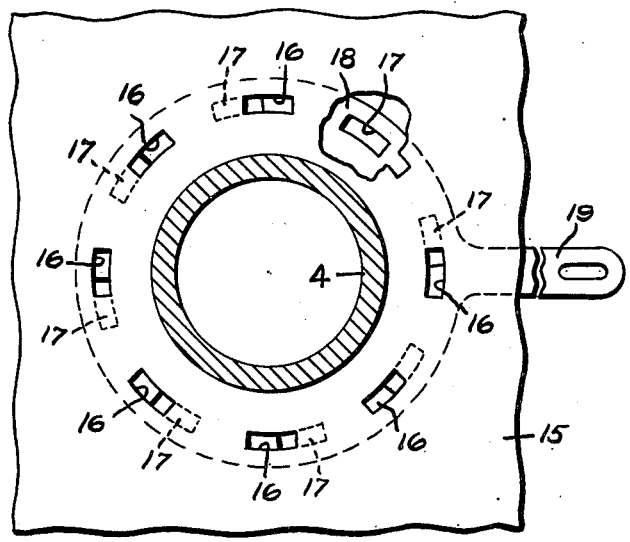
Fig. 3 is an enlarged portion of Fig. 2 showing an alternate variable plate opening by the use of a damper.

Fig. 3 shows an alternate means of providing an adjustable cooling-gas inlet 14. In this embodiment a circular damper plate 18, having suitably sized, uniformly spaced, slotted openings 17 defined by the arcs of two concentric circles and the radial projections enclosed therebetween for any given degree of arc, is rotatably affixed to encircle the hot-gas conduit 4 within chamber 3 and supported in contact with the lower surface of plate 15. The damper plate 18 is rotated through the projection 19 which is linked to any suitable rod or linkage to permit independent or uniform control of all slotted openings 16 in the plate 15. The slotted openings 16 are defined in a similar manner to the damper openings 17, but are slightly smaller such that when fully open the edges of the damper opening 17 will not meet or overlap the plate openings 16. The relative spacing of the two sets of openings are suitably designed to provide a wide range of control from substantially closed to a completely open position. Preferably the degree of arc should be relatively small, i. e., in the range of about 10 degrees or less, to provide sufficient openings to effect a uniform distribution of cooling gas at the base of the bag filter. Other shaped openings can be employed in a similar manner.

In an experimental run a filter bag 9.5 inches in diameter and 54 inches long was attached to a hot-gas inlet. Thermocouples were affixed at various points inside the bag filter and on its outside surface. The exterior of the filter bag was air cooled. The hot, solids-laden gas was delivered at about 29.6 cubic feet per minute (C. F. M.) at a temperature of about 428° F. The filter-bag area was about 11.2 square feet and the gas filtration rate was about 2.64 C. F. M. per square foot.

Under the above conditions, the temperature of the outside surface of the filter bag was 226° F. one-half inch above the gas inlet. The temperatures of the outside surface of the filter bag and the interior of the filter bag were respectively as follows:

6 inches above gas inlet_____ 208° F., 381° F.
18 inches above gas inlet_____ 208° F., 345° F.
30 inches above gas inlet_____ 178° F., 309° F.
40 inches above gas inlet_____ 147° F., 270° F.

In another lengthy run a plurality of wool bag filters having a total surface of about 400 square feet were employed to filter hot, solid-laden gas at a temperature of from about 356 to about 392° F. at a rate of about 600 to about 700 C. F. M. Cool air from about 77 to about 86° F. was passed over the outside surface of the bags at a rate ranging from about 2000 to about 3000 C. F. M. The temperature of the outside surface of the bag filters was measured and found to vary from about 104 to about 176° F., the higher temperatures being near the hot-gas inlet. The pressure drop across the dust collector was found to vary from about 5 to about 9 inches of water throughout the run. After several weeks in use for the above system the bags were examined and no scorching or deleterious effects noted notwithstanding the fact that the solid-laden gas was at a far higher temperature than could have been employed in the prior art apparatus.

With the improved apparatus of the present invention it has been found possible to use bag filters for handling solid-laden, hot gases from about the scorching temperature of the bag-filter fabric up to about 500° F. or higher. It will be understood that the temperature and volume relationship of the cooling gas can be varied in all suitable combinations to effect sufficient cooling capacity to prevent scorching of the bag-filter fabric, i. e., for any given system the higher the temperature of the cooling gas the greater will be the volume required to provide the desired cooling effect. It will also be understood that the temperature differential between the hot, solid-laden gas and the cooling gas will normally be large and that the maximum temperature of the cooling gas will be substantially below the scorching temperature of the bag-filter fabric. In limited cases it is advantageous to refrigerate the cooling gas prior to passing into the cooling-gas-inlet chamber to effect a greater temperature differential between the hot and cool gases.

We claim:

1. A dust-collecting apparatus for filtering and collecting solids from hot gas comprising a three-sectional chamber including an enclosed-filter chamber having a plurality of hot-gas inlets and an outlet, a plurality of flexible bag filters arranged in a substantially vertical position within said chamber, the upper ends of said bag filters being closed and supported by a suspension means and having means for dislodging impinged solids, and the lower ends thereof being removably affixed to the said hot-gas inlets by a collar means; said plurality of hot-gas inlets being directly connected by open passageways with a solids-collection chamber having an inlet for the solid-laden, hot gas and a solids-discharge valve at the bottom of the solids-collection chamber; and interposed between said enclosed-filter chamber and said solids-collection chamber a cooling-gas-inlet chamber having an inlet for the cooling gas and a plurality of outlets, through the common separator plate between the cooling-gas-inlet chamber and the enclosed-filter chamber, uniformly located circumferentially around the outside of the base of each of the filter bags and in proximity thereto to provide a substantially uniform cooling-gas temperature and bathe the exterior of said bags in a stream of cooling gas.

2. The dust-collecting apparatus of claim 1 wherein the plurality of openings around the outside base of the fabric bag filters are adjustably controlled by slotted dampers rotating around the hot-gas-inlet conduits, and in contact with the lower surface of the plate separating the filter chamber from the cooling-gas-inlet chamber, in an arc sufficient to control the said openings from a substantially closed to a completely open state.

References Cited in the file of this patent

UNITED STATES PATENTS

| | | |
|---|---|---|
| 259,872 | Kirk | June 20, 1882 |
| 757,475 | Macardle | Apr. 16, 1904 |
| 2,368,263 | Schneible | Jan. 30, 1945 |